No. 837,209. PATENTED NOV. 27, 1906.
F. H. FELLOWS.
NUT LOCK.
APPLICATION FILED DEC. 8, 1905.
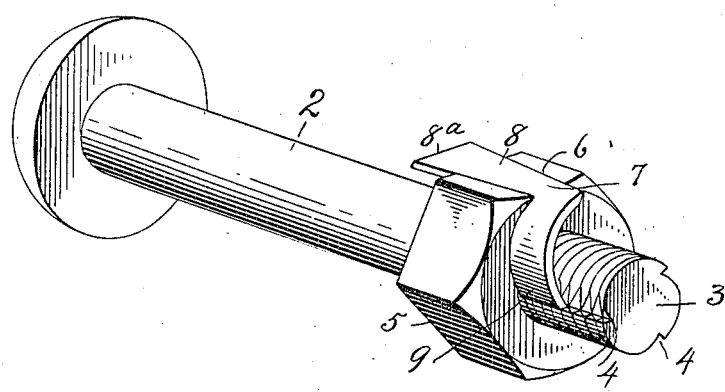
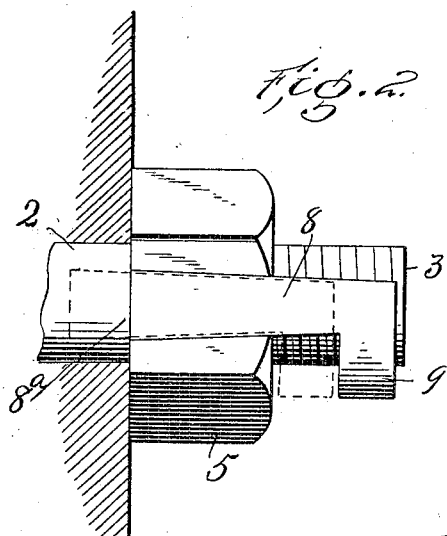
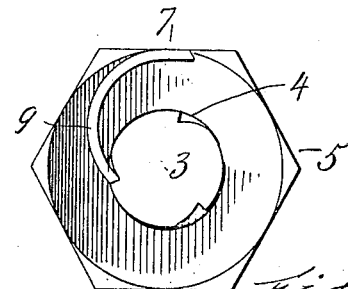
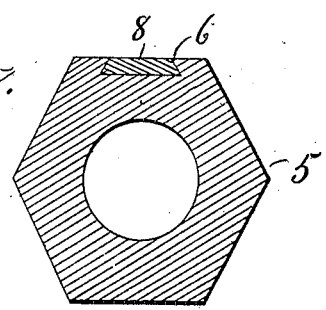
Witnesses
C. R. Thomas
Ruth Cooper
Inventor
Frank H. Fellows
By
Attorneys

UNITED STATES PATENT OFFICE.

FRANK H. FELLOWS, OF MIDDLEPORT, OHIO.

NUT-LOCK.

No. 837,209.    Specification of Letters Patent.    Patented Nov. 27, 1906.

Application filed December 8, 1905. Serial No. 290,942.

*To all whom it may concern:*

Be it known that I, FRANK H. FELLOWS, a citizen of the United States, residing at Middleport, in the county of Meigs and State of Ohio, have invented new and useful Improvements in Nut-Locks, of which the following is a specification.

This invention relates to nut-and-bolt locks, and particularly to a device of this character which is especially adapted to secure fishplates to railroad-rails for connecting them, to reliably hold connecting parts in bridgework, machinery, and other places where the nut must be held against the chance of working loose or becoming detached from the bolt.

The object of the invention is to provide a nut-locking device which is simple and inexpensive in construction and is quite effective and durable in use.

The matter constituting my invention will be defined in the claim.

I will now describe the details of construction and operation of my improved device by reference to the accompanying drawings, in which—

Figure 1 represents a perspective view of a bolt, nut, and locking key or pawl assembled in operative position. Fig. 2 represents a top plan view of a nut with the key and spring-pawl in place. Fig. 3 represents an end face view of the nut, pawl, and bolt. Fig. 4 represents a vertical transverse section of nut and pawl-shank.

My nut-locking device is shown applied to an ordinary threaded bolt 2, having a screw-threaded end 3 for application of a hexagonal or other angular nut 5. The bolt 2 is constructed in the usual manner, except that it is provided with one or more, preferably three, longitudinal grooves 4 in the outer end, which are preferably cut before the bolt is threaded. The grooves are preferably made each with a long incline at one side and a short undercut incline at the opposite side, as shown, so as to form an effective bearing for the spring-pawl of the locking-key and permitting the nut to be readily screwed onto the bolt, but preventing it from turning backward or to the left and becoming loosened.

The nut may be hexagonal, as shown, or square and of the usual construction, except that in one side or face is formed a dovetailed groove 6, which is made tapering from the inner end of the nut to the outer end, as clearly shown in Fig. 2. This groove or recess is preferably formed when the nut is cast or struck up and adds nothing to the cost of the nut.

The locking-key 7 is preferably made of spring metal and is composed of the shank 8 and lateral curved pawl. The shank 8 is longitudinally tapered from its inner end 8ª to the pawl 9 and has beveled edges adapted to fit and be securely held in groove 6. As will be seen in Fig. 2, the shank 8 is longer than the groove and face of the nut, so as to provide for an endwise-sliding movement thereof from the inner end outward after it is placed in the groove. The curved spring-pawl 9 extends laterally from the outer narrow end of the shank and is of the proper length to bear upon the screw-threaded bolt and engage with its grooves 4. By placing the pawl 9 against the outer end of the nut the narrow part of the tapering shank 8 may be dropped into the tapering groove 6, as shown in dotted lines, Fig. 2. In actual use the nut may be first screwed a short distance, about a quarter-inch, beyond the end of the bolt and then the locking-key 7 placed in the position shown by dotted lines in Fig. 2, the pawl 9 being against the outer end of the nut and its point in a groove 4 and the narrow part of the shank in groove 6. The shank may now be pulled outward to cause it to engage with the tapering dovetailed groove and the nut turned inward on the screw-threaded bolt. As the nut is screwed against its bearing the inner end of the shank 8 will make contact with the bearing and the shank be forced tightly into its groove and rigidly held in place. The spring-pawl will slide over the threaded bolt as the nut is turned inward; but when the nut is on its seat the pawl will engage one of the grooves 4, so as to prevent the nut from turning backward or unscrewing, but will securely lock it against its bearing.

My special nut can be made without additional expense as compared with the common nut, and practically the only additional expense in my device is the trifling cost of the locking-key with spring-pawl.

Having described my invention, what I claim as new, and desire to secure by Letters Patent, is—

A nut-lock device comprising a screw-threaded bolt having a longitudinal groove, a nut having in one face a dovetailed groove tapering from the inner to the outer end thereof, and a locking-key having a shank longer than the nut and provided at its outer end with a curved spring-pawl adapted to engage with the groove in the bolt, said shank being tapered from its inner end toward the spring-pawl at its outer end, whereby the shank may be inserted in the groove and then pulled outward and will be securely held in place when the nut is screwed down to its bearing, substantially as described.

In testimony whereof I affix my signature in presence of two witnesses.

FRANK H. FELLOWS.

Witnesses:
E. B. CLARK,
C. R. THOMAS.